United States Patent [19]

Curtindale et al.

[11] Patent Number: 5,267,761
[45] Date of Patent: Dec. 7, 1993

[54] VEHICLE CONSOLE WITH POSITIVE PUSH-PUSH DOOR LATCH

[75] Inventors: Edward G. Curtindale, Farmington Hills; Mark J. Brow, Allen Park, both of Mich.

[73] Assignee: United Technologies Automotive, Inc., Dearborn, Mich.

[21] Appl. No.: 846,543

[22] Filed: Mar. 5, 1992

[51] Int. Cl.⁵ .................. B60R 7/04; F05C 19/02
[52] U.S. Cl. .................. 292/81; 292/DIG. 4
[58] Field of Search .................. 292/DIG. 4, 81

[56] References Cited

U.S. PATENT DOCUMENTS

| | | |
|---|---|---|
| 2,826,444 | 9/1955 | Kurilenko . |
| 3,854,784 | 12/1974 | Hunt et al. .................. 292/DIG. 4 |
| 3,854,785 | 12/1974 | Manner et al. .................. 292/DIG. 4 |
| 4,552,399 | 11/1985 | Atarashi . |
| 4,641,747 | 2/1987 | Mestdagh et al. .................. 292/DIG. 4 |
| 4,657,292 | 4/1987 | Bruck .................. 292/DIG. 4 |
| 4,669,764 | 6/1987 | Bruck .................. 292/DIG. 4 |
| 4,925,072 | 5/1990 | Masler et al. .................. 292/DIG. 4 |
| 4,988,134 | 1/1991 | Vidwans et al. . |
| 5,020,845 | 6/1991 | Falcoff et al. .................. 292/DIG. 4 |
| 5,040,833 | 8/1991 | Brunnert .................. 292/DIG. 4 |
| 5,050,922 | 9/1991 | Falcoff . |

Primary Examiner—Eric K. Nicholson
Attorney, Agent, or Firm—Harness, Dickey & Pierce

[57] ABSTRACT

The console for a motor vehicle has a wall structure defining a compartment and a door for closing said compartment wherein the console has a latch mechanism engageable by the door for selectively maintaining the door in a closed position and the latch mechanism is releasable by movement of the door from a normal closed position to an over-closed position. The latch mechanism is provided with a spring which biases the door towards an open position only when the door is moved into an over-closed position, thereby preventing unintentional opening of the door by forces exerted upon the vehicle.

8 Claims, 3 Drawing Sheets

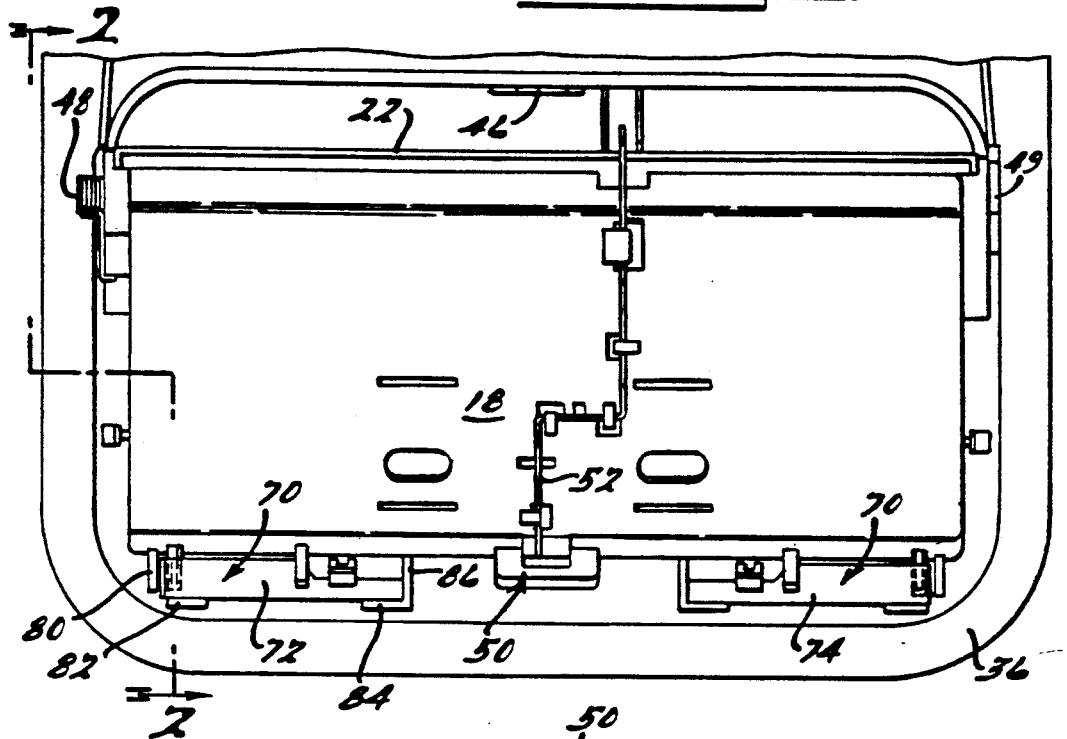

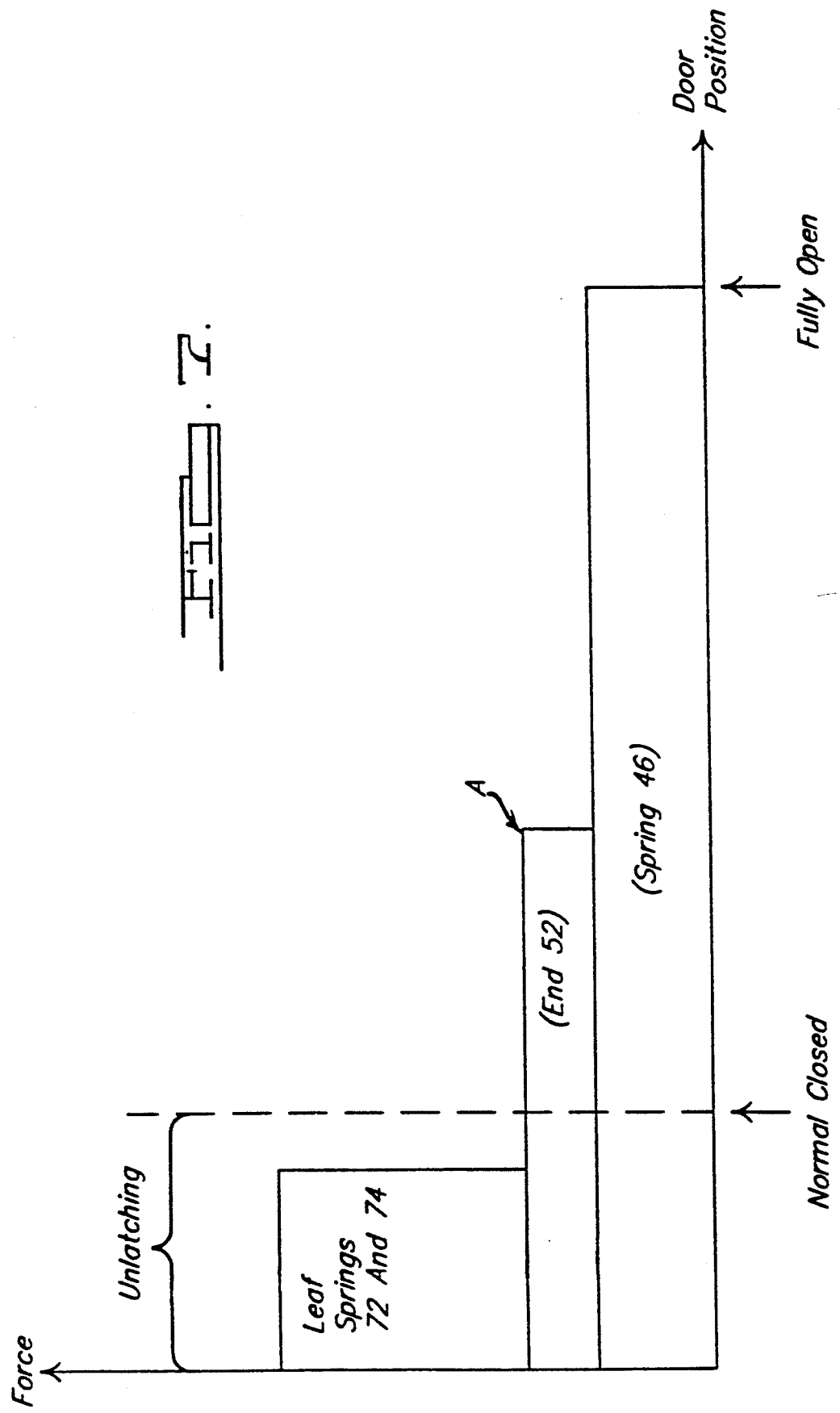

5,267,761

VEHICLE CONSOLE WITH POSITIVE PUSH-PUSH DOOR LATCH

BACKGROUND OF THE INVENTION

This invention relates generally to consoles for vehicles, and more specifically, to consoles or other areas having push-push door or drawer latches.

As automotive design and technology evolve, more and more electronic accessories such as advanced audio systems, computers and the like find their way into modern automobile instrument panels. Accommodation for such accessories in instrument panels leaves little extra room for interior storage. However, the need for interior storage room oftentimes cannot be fulfilled by the traditional instrument panel glove compartment. Thus, modern automotive interiors employ many diverse storage compartments for garage door opener remote controls, sunglasses and the like, and items such as sliding cup holders and fuse access doors, in such areas as the instrument panel, interior door panels and center consoles between the driver and passenger seat.

Recently, automotive ceilings have also been used as locations for overhead console storage compartments to accommodate smaller objects such as the above mentioned garage door opener remote controls and sunglasses. Examples of such vehicle consoles are disclosed in U.S. Pat. Nos. 4,275,913 Jun. 30, 1981 to Marcus; 4,368,937 Jan. 18, 1983 to Palombo et al; 4,469,365 Sep. 4, 1984 to Marcus et al.; 4,595,228 Jun. 17, 1986 to Chu; 4,657,292, Apr. 14, 1987 to Bruck; 4,867,498 Sep. 19, 1989 to Delphia et al.; and 5,050,922 Sep. 24, 1991 to Falcoff. For ease of opening and closing of the console doors, without necessitating the diversion of the drivers attention from the road, such doors are often provided with what are known as push-push latches. A console door provided with such a latch is normally biased in an open direction and is opened by pushing in on the door and closed by again pushing in on the door.

It will be appreciated that a console door which has a push-push type latch can be subject to unlatching if inertial forces associated with the door's own weight cause the door to move with respect to the console wall structure in a direction to release the latch. The result can be an undesirable, unexpected opening of the door and possible release of the contents of the console. Consoles installed in vehicles are, of course, subjected to considerable inertial forces which can cause such undesirable unlatching due to hard braking, uneven roads or even accidental contact with other vehicles or objects. It will also be appreciated that push-push latches, while convenient and reliable, can rattle and/or require inconsistent forces to open and close, both of which situations a user might find to be annoying.

The present invention is directed to the above problems associated with push-push type latches for vehicle console doors. In accordance with the present invention, a console for a motor vehicle having a wall structure and a door which can be opened by a force applied thereto in generally the same direction as inertial forces thereon is provided with a push-push door latch having a spring mechanism which biases the door sufficiently to prevent unwanted opening thereof. The invention is particularly well suited for use in consoles such as overhead consoles having doors which face at least partially rearwardly.

The invention well achieves its purpose of providing a console having a door with a latch having a positive mechanism which minimizes unwanted or unexpected unlatching regardless of the direction of the inertial forces. The latch of the invention further enjoys the further advantages of minimizing rattles and requiring consistent opening/closing forces, even when subjected to heat (e.g. when the vehicle is parked in the sun). Still further, the latch has self-contained and integrally molded features, requires no special assembly and is economical.

SUMMARY OF THE INVENTION

In accordance with the present invention, a console for a motor vehicle has a wall structure defining a compartment and a door for closing said compartment wherein the console has a latch mechanism engageable by the door for selectively maintaining the door in a closed position and the latch mechanism is releasable by movement of the door from a normal closed position to an over-closed position. The latch mechanism may be provided with a spring which biases the door towards an open position only when the door is moved into an over-closed position.

DESCRIPTION OF THE DRAWINGS

FIG. 3 is a top plan view of the overhead console shown in FIG. 1.

FIGS. 4 to 6 are end elevations of the overhead console shown in FIG. 1 with portions thereof broken away to illustrate the operation of a latch mechanism of the present invention.

FIG. 7 is a graph generally depicting the cooperation of forces produced by the spring system.

DESCRIPTION OF THE INVENTION

Figure 1:
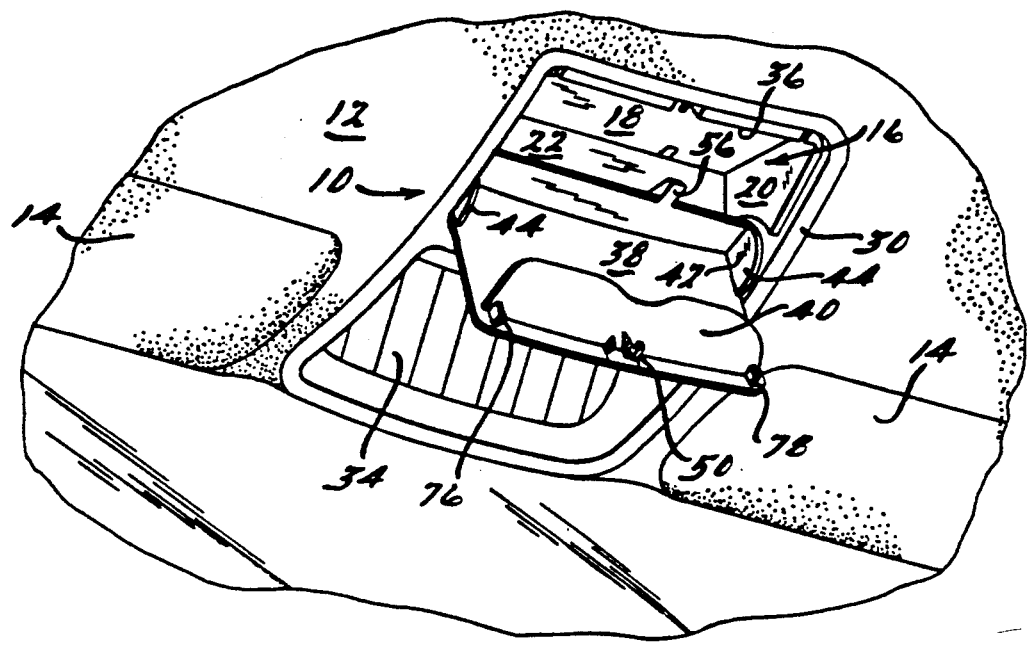
FIG. 1 is a perspective view of a preferred embodiment of an overhead console of the present invention with the door thereof shown in an open position.

Now referring to the drawings an overhead console 10 of the present invention is shown at the forwardmost portion of an automobile headliner 12. For reference purpose, the vehicle's sun visors 14 are shown at the forward edge of headliner 12. The overhead console comprises a storage compartment 16 defined by a wall structure which includes a top wall 18, side walls 20, forward wall 22 rear wall 24 and door 38. The storage compartment also has a trim bezel 30 which cooperates with a snap-fit ring 32 (FIG. 3) to clampingly engage an edge of headliner 12 therebetween to thereby retain console 10 on an aperture in headliner 12 as is conventional in the art. A courtesy lamp module 34 may be mounted at the forward portion thereof. Trim bezel 30 has an opening 36 provided therein for access to storage compartment 16. Door 38 with sunglasses holder 40 is pivotably mounted within opening 36.

Figure 2:
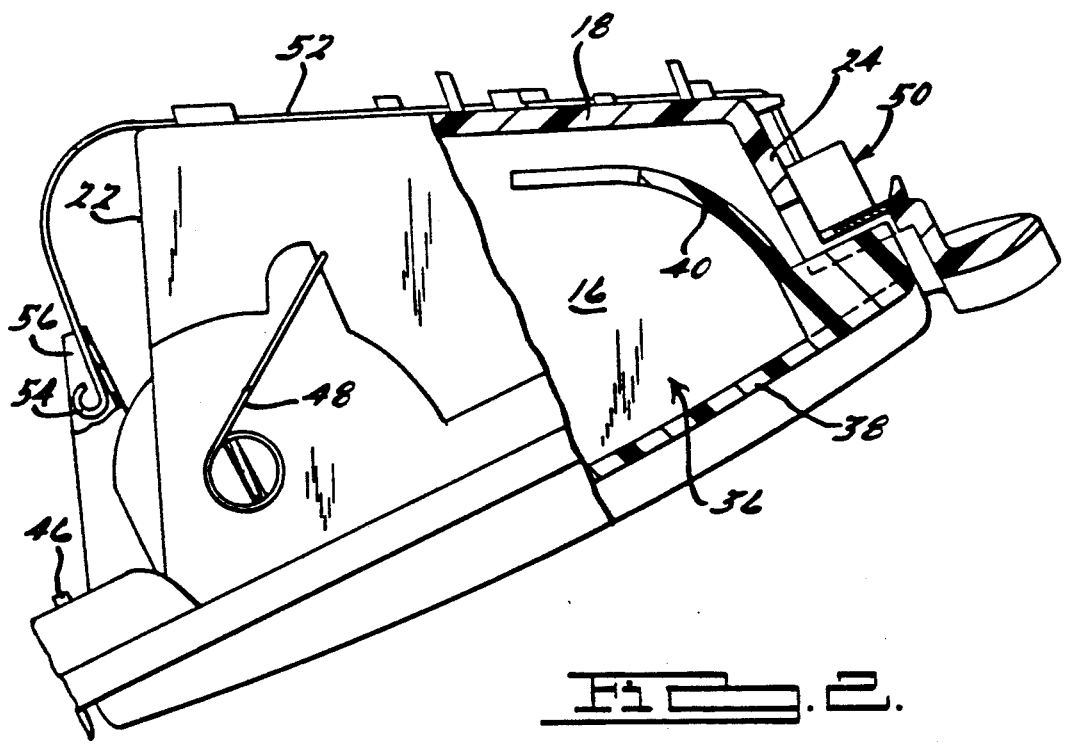
FIG. 2 is a side elevation of the overhead console shown in FIG. 1, portions thereof being sectioned to show details of construction, and the door thereof being shown in an open condition.

The periphery of door 38 is maintained in registry with opening 36 when the door is closed. Door 38 is pivotally attached by pins 42 in ears 44 to side walls 20 (FIG. 1). A tab 46 (FIGS. 2 and 3) contacts forward wall 22 to limit opening of door 38 which is biased in an opening direction by spring 48. Spring 48 provides a force to cause the door 38 to swing open when the door is unlatched. A damper 49, axially opposite spring 48

(FIG. 3) controls the rate at which the door opens when unlatched.

Door 38 is provided with a push-push latch 50. Perhaps best seen in FIGS. 3-6, latch 50 comprises a spring detent 52, self biased in a clockwise direction (as viewed in FIG. 4) from its position of attachment against top wall 18. The rearward facing wall of sunglasses holder 40 on door 38 is provided with a catch 58 comprising a slot 60 and a raised, generally V-shaped cam 62 having a notch 64 and surfaces 66 and 68 thereon. Spring detent 52 selectively engages and disengages catch 58, as shown in FIGS. 4-6, to latch the door with a push-push action.

To assist in overcoming frictional forces between spring detent 52 and the cam surfaces when disengaging the catch, a spring force in addition to that supplied by spring 48 may be required. Accordingly, the forward end portion 54 of spring 52 (FIG. 2) extends downwardly and contacts flange 56 of door 38 to add additional spring force to bias door 38 in an opening direction when door 18 is closed. The forward end portion 54 and flange 56 are spatially arranged so that the additional spring force provided by end portion 54 is added only during the first few degrees of door-opening rotation. The flange 56 ultimately rotates out of contact with the forward end portion 54 so that the end portion will no longer provide additional spring force. See FIG. 1.

In accordance with the present invention, overhead console 10 also has positive, biasing or pre-loading means 70 for preventing unwanted unlatching of push-push latch 50. Broadly speaking, positive biasing or pre-loading means 70 comprises a spring system which acts to bias door 38 in an opening direction when door 38 is moved from a normal closed position to an unlatching position. The presently preferred spring system employs a pair of leaf springs 72 and 74. Leaf springs 72 and 74 are secured on the top of bezel 36, where they may be contacted during door opening by projections 76 and 78 extending upwardly from door 38 (FIGS. 1 and 6). Leaf spring 72 is in tension with ends between walls 80, 82, 84 and 86. Projection 88 constrains the median top surface of spring 72. Leaf spring 74 is analogous to spring 72.

The projections 76 and 78 are of suitable length so that they do not significantly deflect leaf springs 72 and 74 when the door is in a normal closed position (shown in FIG. 4). Thus, in the normal closed position leaf springs 72 and 74 do not contribute significantly, if at all, to the biasing forces tending to urge the door to the open position. When the door is depressed past the normal closed position, to unlatch push-push latch 50 (shown in FIG. 5), projections 76 and 78 are urged in contact with the leaf springs, causing the leaf springs to deflect and add substantially to the biasing forces acting in the door opening direction. This added biasing force prevents undesired unlatching due to inertial forces, such as produced by hard braking or the like.

In the presently preferred embodiment, projections 76 and 78 do not contact the leaf springs in the normal closed position. Thus the leaf springs do not exert a force on projections 76 and 78 in the normal closed position. Because no force is exerted, the projections 76 and 78 are not likely to become flattened or deformed by the leaf springs, even if the projections become softened due to ambient heat within the vehicle passenger compartment.

From the foregoing, it will be understood that the vehicle console door is controlled by a compound or multi-stage spring system. Spring 48 and damper 49 cause the unlatched door to swing open at a controlled rate. The end portion 54 of spring 52 assists spring 48 over the beginning portion of the opening cycle, to overcome frictional forces associated with the push-push latch 50. Both spring 48 and end portion 54 also bias the door in its normal closed position to minimize rattles. This same biasing force of spring 48 and end portion 54 also serves to urge the door in an opening direction so that the latch will not readily vibrate out of the latched condition. While spring 48 provides a force on the door over the door's entire rotational range of movement, end portion 54 has an effect only over a portion of the rotational range of movement of the door. Leaf springs 72 and 74 add substantial additional biasing force over the comparatively small range of door movement during unlatching.

FIG. 7 illustrates the way in which the forces produced by this multi-stage spring system cooperate. As illustrated, when the door is in the normal closed position, the forces of spring 48 and end portion 54 combine to bias the door in the latched position and to minimize rattles. When the door is rotated in an unlatching direction (by pressing the door upwardly toward the headliner) leaf springs 72 and 74 add a significant additional biasing force to resist the unlatching movement. Springs 72 and 74 thus add to the force which must be applied in order to unlatch the door, preventing undesirable unlatching not initiated by the vehicle occupant. Once unlatched, the door may be rotated to the open position. After a certain degree of rotation toward the fully open direction, depicted generally at A in FIG. 7, end portion 54 ceases to exert its bias force on the door. After this point, the door will swing open at a rate controlled only by spring 48 and damper 49.

Operation of the push-push latch is as follows. In the closed position of the door as shown in FIG. 4, the free end of wire detent 52 is received within notch 64 in cam 62. When in cam 62. When the door is pressed slightly upwardly and forwardly, the end of detent 52 is freed from notch 64 and points slightly clockwise under its internal spring force, thereby allowing door 38 to pivot downwardly to an open position as the end of detent 52 slides along surface 68 of cam 62. To close door 38, door 38 is pivoted upwardly toward its closed position, whereupon the end of detent 52 slides along cam surface 66 which pivots the end of detent 52 slightly counterclockwise until the end of detent 52 reaches the end of cam surface 66 at which point it pivots slightly clockwise under its internal spring force, to snap the end thereof into notch 64, thereby allowing door 38 to pivot downwardly and thereby latching the door in a closed position.

As explained above, to provide positive control of the opening of door 38 and to reduce the chances of unexpected or unwanted opening of door 38 by inertial forces associated with the door's own weight console 10 is provided with positive biasing or pre-loading means 70 which operates as follows. In the normal closed position of door 38, projections 76 and 78 lie proximate to ends 90 and 92 of springs 72 and 74. Then, when door 38 is pivoted upwardly, projections 76 and 78 contact ends 90 and 92 of springs 72 and 74 and flex the associated spring end upwardly against the spring force, e.g. 4 to 9 Newtons. Thus, positive force is required to urge door 38 upwardly against spring ends 90 and 92. Upon reaching the upward point of pivotal movement by door 38 where detent 52 releases cam 62, spring ends 90 and 92 provide downward force which assists in opening door 38.

From the foregoing, it will be appreciated that the position latch employed in the vehicle console of the present invention positively latches the console door under conditions of rapid vehicle deceleration associated with emergency breaking and the like. The latch is simple, yet effective and capable of being economically mass produced and installed.

While the particular embodiment of the console of the present invention has been shown and described, it will be understood that various modifications thereof may suggest themselves to those skilled in the art. For example, while a specific console configuration adapted for the storage of any of various small articles has been shown, the positive latch of the present invention is employable with any overhead console such as various overhead consoles employed for the storage of specific objects such as sun glasses, transmitters for garage door openers and the like. Furthermore, while a specific push-push latch structure and hinge means have been shown, various other equivalent latches and hinges may be employed. It is intended by the following claims to cover all such modifications as fall within the true spirit and scope of this invention.

Having thus described the invention,
What is claimed is:

1. A compartment closure system for an automotive vehicle overhead console, said compartment closure system comprising:
   a pivotable closure member having a push-push latching mechanism, said closure member being adapted for selective movement to a closed position and to an open position;
   said latching mechanism having detent means for alternately assuming a latched state, in which said closure member is held in said closed position, and an unlatched state, in which said closure member is not held in said closed position;
   said detent means being coupled to said closure member so that movement of said closure member to a predefined position causes said detent to change from said latched state to said unlatches state;
   biasing means cooperating with said closure member for providing a force to resist movement of said closure member to said predefined position and to thereby inhibit said detent means from assuming said unlatched state, said biasing means resisting inertial forces created by hard braking of said automotive vehicle; and
   a spring system coupled to said closure member for urging said closure member toward the open position.

2. the closure system of claim 1 wherein said spring system produces forces which assist the force provided by said biasing means in resisting movement of said closure member to said predefined position.

3. The closure system of claim 1 wherein said closure member is adapted for movement over a predetermined range and wherein said spring system provides forces tending to urge said closure member toward the open position over substantially the entire range.

4. The closure system of claim 1 wherein said closure member is adapted for movement over a predetermined range, wherein said spring system provides forces tending to urge said closure member toward the open position over substantially the entire range and wherein said biasing means provides said force to resist movement of said closure member to said predefined position over substantially less than the entire range.

5. The closure system of claim 1 wherein said closure member is adapted for movement over a predetermined range and wherein said spring system comprises a multiple spring system which provides different forces over predetermined portions of said predetermined range.

6. The closure system of claim 1 wherein said biasing means comprises at least one leaf spring.

7. The closure system of claim 1 wherein said closure member defines a compartment door.

8. The closure system of claim 1 wherein said biasing means provides no substantial closure member resisting force when said closure member is at rest in said closed position.

* * * * *